United States Patent
Ruth et al.

(10) Patent No.: US 10,079,830 B2
(45) Date of Patent: Sep. 18, 2018

(54) LOCKABLE NETWORK TESTING DEVICE

(71) Applicant: JDS Uniphase Corporation, Milpitas, CA (US)

(72) Inventors: Al Ruth, Indianapolis, IN (US); Brian Ice, Indianapolis, IN (US); Rodney Harbison Weaver, Macon, GA (US); Koji Okamoto, Indianapolis, IN (US)

(73) Assignee: VIAVI SOLUTIONS INC., Milpitas, CA (US)

( * ) Notice: Subject to any disclaimer, the term of this patent is extended or adjusted under 35 U.S.C. 154(b) by 136 days.

(21) Appl. No.: 14/677,237

(22) Filed: Apr. 2, 2015

(65) Prior Publication Data
US 2015/0304332 A1    Oct. 22, 2015

Related U.S. Application Data

(60) Provisional application No. 61/980,834, filed on Apr. 17, 2014.

(51) Int. Cl.
*H04L 29/08* (2006.01)
*H04L 29/06* (2006.01)
*H04L 12/26* (2006.01)

(52) U.S. Cl.
CPC .............. *H04L 63/10* (2013.01); *H04L 43/50* (2013.01); *H04L 67/025* (2013.01); *H04L 67/10* (2013.01); *H04L 67/1085* (2013.01); *H04L 67/1095* (2013.01); *H04L 43/16* (2013.01)

(58) Field of Classification Search
None
See application file for complete search history.

(56) References Cited

U.S. PATENT DOCUMENTS

| | | | |
|---|---|---|---|
| 7,181,507 B1 * | 2/2007 | Lavelle | H04W 12/08 707/999.01 |
| 8,116,737 B2 * | 2/2012 | Li | H04W 8/205 455/410 |
| 8,163,035 B2 * | 4/2012 | Bhansali | G06F 21/572 340/287 |
| 8,274,365 B2 * | 9/2012 | Piccirillo | E05B 41/00 340/5.6 |
| 8,274,401 B2 | 9/2012 | Rudolf et al. | 340/870.03 |
| 8,811,949 B2 * | 8/2014 | Shen | H04L 63/083 455/411 |
| 2003/0061192 A1 * | 3/2003 | McGunn | G07C 9/00166 |
| 2003/0061503 A1 | 3/2003 | Katz et al. | 726/4 |

(Continued)

*Primary Examiner* — Morshed Mehedi
*Assistant Examiner* — Abdullah Almamun
(74) *Attorney, Agent, or Firm* — Mannava & Kang, P.C.

(57) ABSTRACT

A network testing device may be linked to a dedicated remote server e.g. a cloud-based server having a unique, pre-determined address. The testing device may be configured to cease operating, become locked or limited in testing functionality after a number of startup cycles, days of use, a certain date, etc. Once the testing device is locked, the testing device may be re-activated only by establishing a connection to the server. A database of network testing devices currently in use may be provided. Once a testing device is lost or stolen, the database may be remotely updated to prevent reactivation of that testing device, so as to render the lost or stolen testing device useless for an unauthorized operator of the testing device.

21 Claims, 5 Drawing Sheets

(56) References Cited

U.S. PATENT DOCUMENTS

| | | | |
|---|---|---|---|
| 2003/0195819 A1* | 10/2003 | Chen | G06Q 20/02 705/26.35 |
| 2008/0027813 A1* | 1/2008 | Kogure | G06Q 30/02 705/14.68 |
| 2009/0016235 A1* | 1/2009 | Tokunaga | H04L 12/2818 370/252 |
| 2009/0293084 A1 | 11/2009 | Pedlow, Jr. et al. | 725/25 |
| 2011/0004893 A1* | 1/2011 | Borislow | H04N 7/165 725/25 |
| 2011/0010761 A1* | 1/2011 | Doyle | G06F 21/6218 726/5 |
| 2011/0202642 A1* | 8/2011 | Shimizu | H04N 7/17318 709/221 |
| 2011/0208857 A1* | 8/2011 | Gentile | H04L 43/065 709/224 |
| 2012/0155619 A1 | 6/2012 | Opaluch | 379/32.01 |
| 2012/0213362 A1* | 8/2012 | Bliding | G07C 9/00309 380/44 |
| 2012/0221622 A1* | 8/2012 | Raju | H04L 67/08 709/202 |
| 2013/0266926 A1* | 10/2013 | Cano | G09B 7/00 434/362 |
| 2014/0091831 A1* | 4/2014 | Nassib | G06F 21/71 326/8 |
| 2015/0135338 A1* | 5/2015 | Moskal | H04L 63/0823 726/30 |
| 2015/0169219 A1* | 6/2015 | Koenig | G06F 3/04886 715/773 |
| 2015/0278479 A1* | 10/2015 | Ervin | G06F 19/3462 700/237 |
| 2016/0187263 A1* | 6/2016 | Brown | G01N 21/8483 348/207.11 |

\* cited by examiner

LOCKABLE NETWORK TESTING DEVICE

CROSS-REFERENCE TO RELATED APPLICATIONS

The present invention claims priority from U.S. Patent Application No. 61/980,834 filed Apr. 17, 2014, which is incorporated herein by reference.

TECHNICAL FIELD

The present disclosure relates to communication network test and measurement equipment and methods, and in particular to methods and devices for network test equipment control and management.

BACKGROUND

Modern communication networks may span across large geographical areas. To maintain, grow, and upgrade the networks, service providers employ teams of service field technicians and provide the technicians with portable network testing devices, which can be taken to local nodes and customer premises for troubleshooting and servicing the network.

As communication networks grow in complexity, so does test equipment. Depending on geographical area, more complex and versatile network testing devices may become costly enough to be attractive to thieves, who may steal the test equipment or even assault the technicians for it. Stolen test equipment may be resold on the black market to contractors not willing to pay top price for the newest test equipment.

A possibility of equipment theft has deterred many operators from purchasing premium test equipment. Instead, the operators may tend to purchase more easily replaceable equipment, because the operators know they will likely need to purchase the equipment regularly, to replace the ones that have been stolen. If the numbers of stolen network testing devices were to go down, network operators would be more willing to pay higher prices for the premium equipment, which is superior in quality, accuracy, and longevity.

Presently, to deter theft, portable network test equipment mostly relies on personal identification numbers (PIN) or biometric data. However, PIN and passwords may be forgotten, lost, or easily conveyed to known or unknown thieves. Biometric data readers, such as fingerprint scanners, retina scanners, or voice recognition systems, are rather complex and costly to purchase and maintain. In some cases, even biometric data may be acquired from the user. For example, a voice ID record may be obtained from the user.

SUMMARY

In accordance with one aspect of the disclosure, a network testing device may be linked to a remote server, e.g. a cloud-based server having a unique, pre-determined net or web address. The testing device may be configured to automatically cease operating, become locked, disable a test functionality, etc., after a number of startup cycles, days of use, and/or after a certain date. Once the testing device becomes locked, the testing device may be re-activated only by establishing a connection to the dedicated server. A database of network testing devices currently used in the field may be maintained. Once a testing device is lost or stolen, the database may be remotely updated to prevent reactivation of the lost or stolen testing device, so as to render the lost or stolen testing device useless for an unauthorized operator. This may deter subsequent theft attempts of similar equipment.

In accordance with an aspect of the disclosure, there is provided a method for automatically locking or unlocking a testing device for testing a communication network, the method comprising:

determining a first value at the testing device, wherein the first value is based on at least one of a current date, a current time, or a number of previous startups of the testing device;

comparing the first value to a threshold, and upon determining that the first value exceeds the threshold, locking the testing device by disabling at least one operating function of the testing device;

establishing a connection between the testing device and a remote server to verify whether the testing device should remain locked;

receiving an unlock command from the remote server; and upon receiving the unlock command from the server, unlocking the testing device by re-enabling the at least one operating function of the testing device.

The remote server may have a unique address e.g. a web or net address (URL), and the testing device may be configured to be unlocked by sending the unlock command only from that unique address. In one embodiment, the database comprises testing device locking-related information addressable by e.g. testing device serial number(s), customer and/or account number(s), etc., so that the remote server may determine whether the testing device is to remain locked by referring to the testing device locking-related information stored in the database. The database may be remotely updated or configured by establishing a secure data communication link between an authorized database administrator and the remote server. The database and/or the server may be cloud-based.

The first value may include the current date, and the locking threshold may include a date after which the testing device is to be locked. The first value may also include a time interval after a previous unlocking of the testing device, and the locking threshold may include a maximum time interval after the previous unlocking of the testing device. The first value may also include a number of startups ("power cycles") of the testing device after the previous unlocking of the testing device, and the locking threshold may include a maximum number of startups after the previous unlocking of the testing device.

The connection between the testing device and the remote server upon locking up the testing device may be conveniently used to ensure an exchange of test related information between the testing device and the remote server. By way of a non-limiting example, configuration update data may be automatically sent from the remote server to the testing device, to ensure that configuration data stored in the testing device is up to date. Furthermore, results of a previous test performed by the testing device may be automatically sent from the testing device to the remote server, to ensure the results are timely uploaded to the remote server for storage and processing.

In accordance with the disclosure, there is further provided a system for remotely locking or unlocking a testing device for testing a communication network, the system comprising:

a database configured to store locking-related information for the testing device; and a server operably coupled to the database, the server configured to:

establish a connection between the server and the testing device, wherein at least one operating function of the testing device is disabled; determine whether the testing device is to remain locked by referring to the testing device locking-related information in the database; and upon determining that the testing device is not to remain locked, send an unlock command to the testing device for unlocking the testing device by re-enabling the at least one operating function of the testing device.

In accordance with the disclosure, there is further provided a testing device for testing a communication network, the testing device comprising:

an access control module configured to:

determine a first value upon starting up the testing device; compare the first value to a threshold, wherein the first value is based on a current date, time, or a number of previous startups of the testing device; and upon determining that the first value exceeds the threshold, lock the testing device by disabling at least one operating function of the testing device; and a communication module operably coupled to the access control module and configured to establish a connection with a remote server upon locking the testing device, for receiving an unlock command from the remote server to unlock the testing device by re-enabling the at least one operating function of the testing device.

In one embodiment, the remote server has a unique pre-determined address e.g. a web address, and the testing device is configured to be unlockable by sending the unlock command only from that unique web address. The testing device may also be configured to be unlockable only by referring to a particular account number and/or a hidden password.

BRIEF DESCRIPTION OF THE DRAWINGS

Exemplary embodiments will now be described in conjunction with the drawings, in which.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art.

Figure 1A:
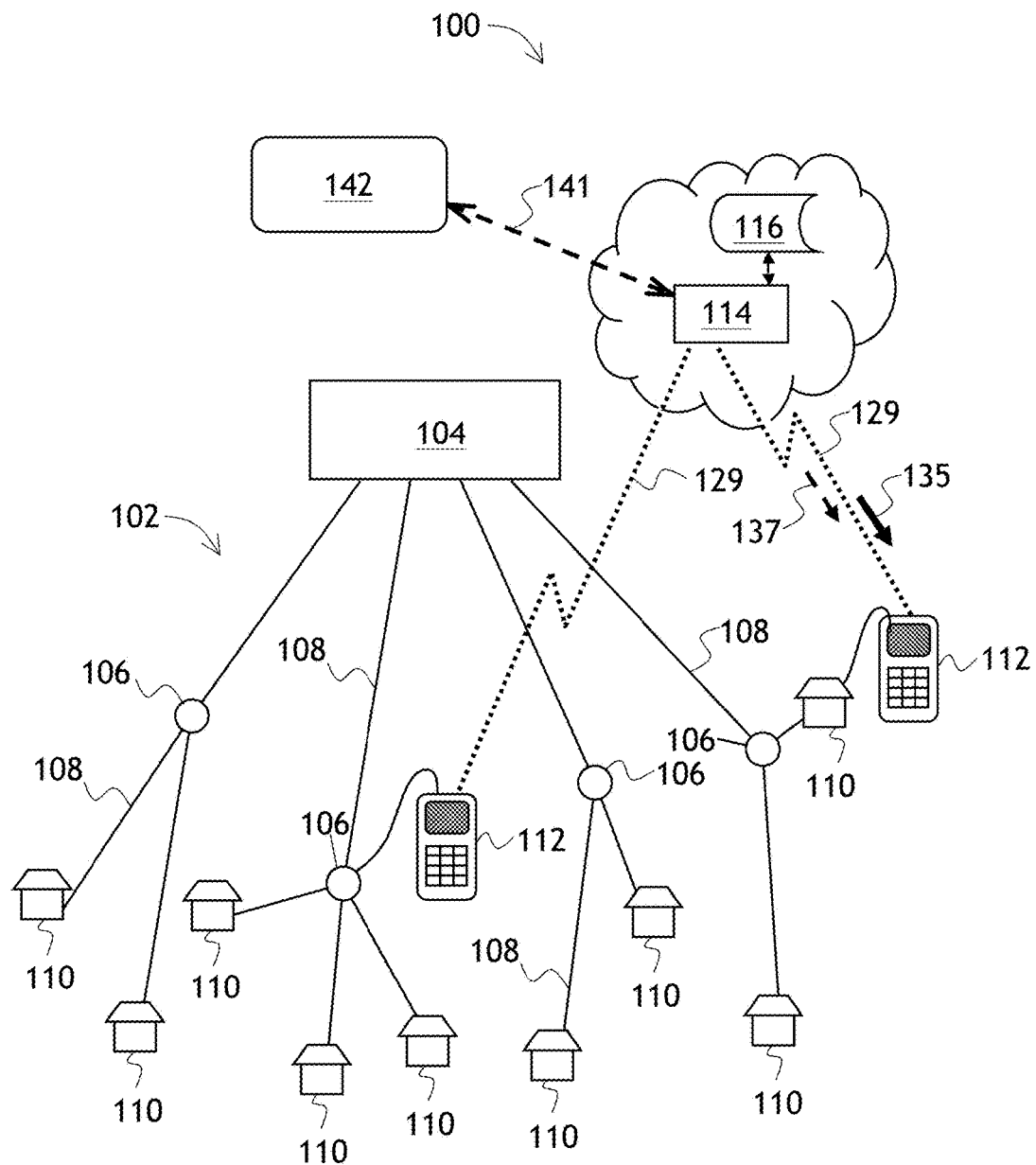
FIG. 1A illustrates a schematic view of a system including a plurality of testing devices and a server for remotely unlocking the testing devices.

Referring to FIG. 1A, a system 100 for remotely locking or unlocking at least one testing device 112 (two are shown in FIG. 1A as an example) for testing a communication network, e.g. a cable network 102, is presented. The cable network 102 may include a headend 104, a plurality of nodes 106 connected to the headend 104 by cable runs 108, and customer premises 110 connected to the nodes 106 by the cable runs 108. The system 100 may include a server 114 operationally coupled to a database 116 for storing testing device locking-related information. The testing device locking-related information may be used for determining which one of the testing devices 112 is to remain operational. Other information, including channel plans, test schedules, etc., may also be stored in the database 116. The cable network 102 is, of course, only an example of a network that may be serviced by the system 100. The system 100 of FIG. 1A may be operated in networks of other types, e.g. hybrid fiber-coax (HFC) networks, passive optical networks (PON), etc.

A perceived value of the testing devices 112 is determined by available testing capabilities of the testing devices 112. Accordingly, an external control of the testing capabilities of the testing devices 112 may reduce or eliminate any potential theft value of the testing devices 112, because testing capabilities of stolen testing devices 112 may be remotely disabled by the system 100. This may rid potential thieves of motivation to steal the testing devices 112, encouraging service providers to safely purchase more testing devices 112.

Figure 1B:
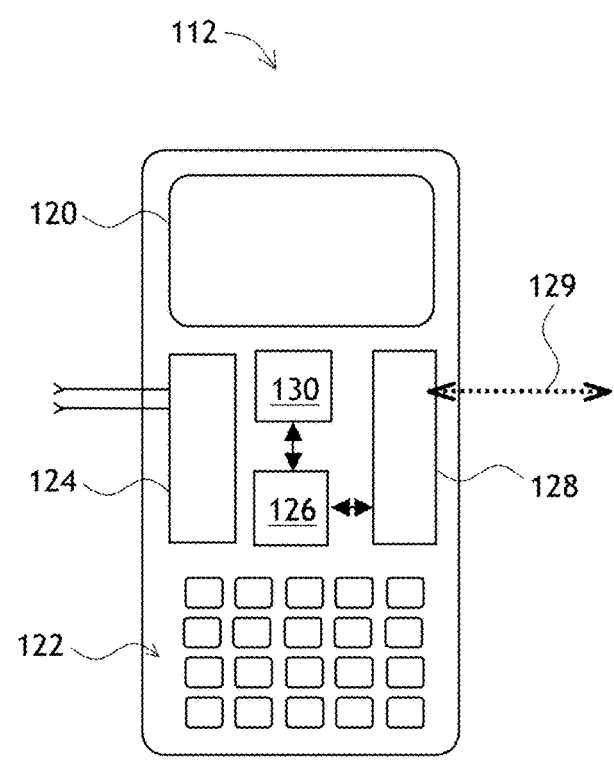
FIG. 1B illustrates a schematic view of one of the testing devices of the system shown in FIG. 1A.

Referring to FIG. 1B, the testing device 112 may include hardware arranged and configured to provide a required testing functionality. By way of example, a display 120, a keypad 122, a signal processing module 124 may be provided. For the purpose of controlling the testing functionality of the testing devices 112, the testing device 112 shown in FIG. 1B may include an access control module 126, a communication module 128 operably coupled to the access control module 126, and a non-volatile memory 130 operably coupled to the access control module 126.

The access control module 126 may be configured to determine a first value upon starting up the testing device 112, and to compare the first value to a threshold. The first value may be based on a current date, time, or a number of previous startups of the testing device 112. By way of a non-limiting example, the access control module 126 may obtain the current date or time from an internal clock, not shown. The access control module 126 may also obtain the number of previous startups of the testing device 112 from the non-volatile memory 130.

Upon determining that the first value exceeds the threshold, the access control module 126 may automatically lock the testing device 112 by disabling at least one operating function or functional module of the testing device 112. By way of a non-limiting example, the display 120, the keypad 122, and/or the signal processing module 124 may be locked or disabled by the access control module 126. The access control module 126 may be implemented in hardware, software, or a combination of the two, as appreciated by those of skill in the art.

The communication module 128 may be configured to establish a connection 129 (manually or automatically) with the server 114 upon locking up the testing devices 112, preferably as soon as possible, e.g. upon connection to a Wi-Fi or other Internet network. The connection 129 may be provided by the cable network 102 itself, or by another network, e.g. a wireless (Wi-Fi) network connected to the Internet. Thus, the testing devices 112 may not need to be connected via a physical cable for the connection 129 to take place. In the embodiment shown in FIG. 1B, the non-volatile memory 130 may be used for storing security configuration data of the testing device 112.

Referring back to FIG. 1A with further reference to FIG. 1B, the server 114 may receive a unique identifier, e.g. serial number, from the testing device 112 identifying the specific testing device 112, and then may be configured to determine whether the testing device 112 is to remain locked by referring to the testing device locking-related information stored in the database 116. The server 114 may be further configured to send, upon determining that the testing device 112 is not to remain locked, an unlock command 135 to the communication module 128 of the testing device 112, for the access control module 126 to unlock the testing device 112 by re-enabling the at least one operating function of the testing device 112.

The remote server 114 may have a unique address, e.g. a unique web hyperlink or net address, which may be used as a security feature. The testing device 112 may be configured to be unlocked by sending the unlock command 135 only from that unique address. This may render an unauthorized re-activation of the testing device 112 rather difficult. The unique address of the remote server 114 may be stored e.g. in the non-volatile memory 130 of the testing device 112, which may include an anti-tampering feature to resist rewriting the non-volatile memory 130. Furthermore, as an additional security feature, the server 114 may be configured to send, upon determining that the testing device 112 is to remain locked, a lock command 137 to the communication module 128 for the access control module 126 to automatically lock the security configuration data stored in the non-volatile memory 130.

In one embodiment, the database 116 may include configuration update data e.g. a channel plan, a test schedule, etc. Upon identifying the specific testing device 112 and the update/download history thereof from the unique identification signal, the server 114 may be configured to send the configuration update data to the testing device 112 along with the unlock command 135, to ensure that the configuration data stored in the testing device 112 is up to date. This feature may be used to ensure that the configurations of all the testing devices 112 are automatically updated on a regular basis. Furthermore, the server 114 and/or the database 116 may be cloud based. Herein, the term "cloud-based" is understood that the computational and/or storage resources may be assigned dynamically, so that "remote server" may refer to a server that may be dynamically assigned, and is identified by the unique address e.g. a net address or a web address.

Figure 2:
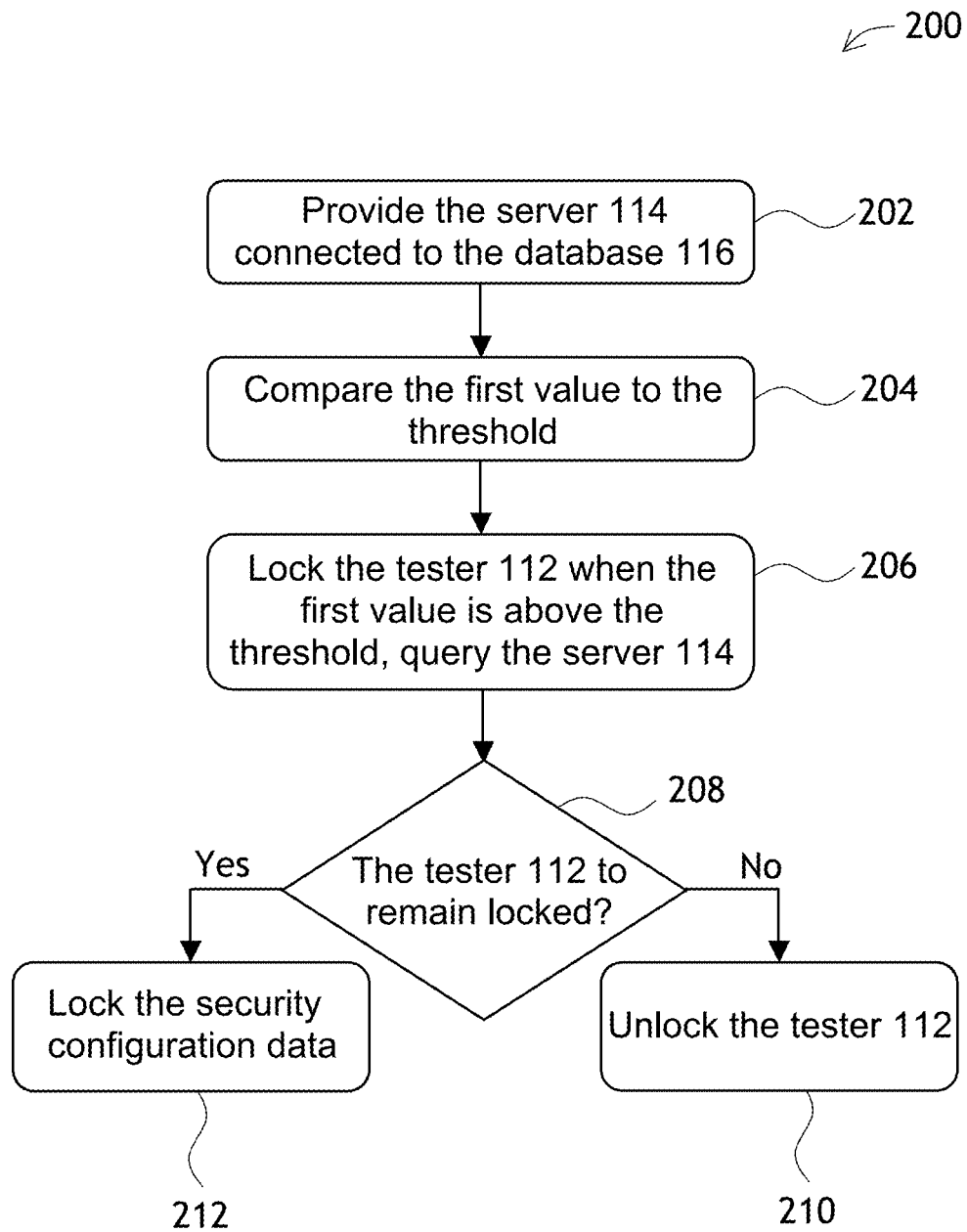
FIG. 2 illustrates a flow chart of a method of operating a testing device for testing a communication network, showing steps related to locking or unlocking the testing device.

Turning to FIG. 2, a method 200 for operating the testing device 112 and the server 114 for automatically locking and unlocking the testing device 112 for testing the cable network 102 is presented. The method 200 may include a step 202 of operably coupling the remote server 114 to the database 116, and entering into the database 116 the required testing device locking-related information. The testing device 112 may be remotely configured by the remote server to activate Anti-theft/Auto-Lock mode, select and store the threshold numbers of days, power cycles, etc., in the non-volatile memory 130. Provided that the Anti-theft/Auto-Lock mode is activated, a threshold comparison step 204 may be performed upon starting up the testing device 112. In the comparison step 204, the testing device 112 may determine the first value and compare the first value to the entered threshold values. As explained above, the first value may be based on current date, time, or a number of previous startups of the testing device. Upon determining that the first value exceeds the corresponding threshold value, a locking step 206 may be performed, in which the testing device 112 is automatically locked by disabling at least one operating function of the testing device 112 until establishing the connection 129 between the testing device 112 and the remote server 114.

Upon establishing the connection between the testing device 112 and the remote server 114, in which the testing device 112 may be identified using a unique identification signal or ID number, the remote server 114 may be queried in a checking step 208 to determine whether the testing device 112 is to remain locked. If the testing device 112 is not to remain locked, an unlocking step 210 is performed, in which the remote server 114 sends the unlock command 135 (FIG. 1A) to the testing device 112 to unlock the testing device 112 by re-enabling the at least one operating function of the testing device 112. If the testing device 112 is to remain locked, then in an optional step 212 (FIG. 2), the lock command 137 (FIG. 1A) may be optionally sent from the remote server 114 to the testing device 112 to automatically lock security configuration data of the testing device 112, to prevent unauthorized use of the testing device 112. For added security, the testing device 112 may be configured so that no user input, entered by way of the testing device keypad 122, may unlock the testing device 112. It may be determined that the testing device 112 is to remain locked when a loss or a theft of the testing device 112 is determined, or merely suspected. The lock command 137 may also include instructions to activate a global positioning system (GPS) tracker, not shown, in the testing device 112, so that the server 114 or other monitoring systems may determine the geographic position of the testing device 112.

The testing device locking-related information may be updated remotely. Referring back to FIG. 1A, a secure data communication link 141 may be established between an authorized database administrator 142 and the remote server 114. As noted above, the server 114 and/or the database 116 may be cloud-based. The authorized database administrator 142 may establish the secure data communication link 141 with the cloud-based database 116 via the remote server 114 using the unique address of the remote server 114.

To update the testing device locking-related information, threshold values, and to activate or de-activate the Anti-theft/Auto-Lock mode, the authorized database administrator 142 may log in to the remote server 114 with an account number and a password, and perform necessary updates of the database 116 by entering testing device locking-related information, threshold values, testing device status, etc. The authorized database administrator 142 may also activate or de-activate the Anti-theft/Auto-Lock mode. When the Anti-theft/Auto-Lock mode is activated, configuring the testing device 112 locally to sync with another web address and account number may be blocked. This may be necessary to ensure that the testing device 112 may not be reconfigured to another account or web address, that could be used to keep the testing device 112 unlocked after the testing device 112 has been lost or stolen. When the Anti-theft/Auto-Lock mode is deactivated, the testing device 112 may operate for an unspecified period of time without having to establish the connection 129 with the remote server 114.

The at least one operating function disabled in the locking step 206 may include a user interface function, such as key input using the keypad 122 of the testing device 112, display of information on the display 120 of the testing device 112, or both. A communication network test function provided by the signal processing module 124, such as tuning to a channel, processing test data, etc., may be disabled as well. A minimum functionality of the testing device 112 may remain to allow the user to establish the connection 129 with the remote server 114. Alternatively, the testing device 112 may be configured so that the connection 129 is completely automatic, so that no user input e.g. password entry is required.

The first value used in the comparison step 204 may be of different types. For instance, the first value may include the current date, in which case the locking threshold may include a date after which the testing device 112 is to be locked. The first value used in the comparison step 204 may also include time interval after a previous unlocking of the testing device 112, in which case the locking threshold may include the a maximum time interval after the previous unlocking of the testing device 112. The first value used in the comparison step 204 may also include a number of startups (power cycles) of the testing device 112 after the previous unlocking of the testing device 112, which case the locking threshold may include the maximum number of startups (power cycles) after the previous unlocking of the testing device 112. A combination of the above types may also be used.

The testing device 112 may be configured so that it maintains its full functionality for a limited period of time, or for a limited number of power cycles, after which time or number of cycles the testing device 112 is locked, and remains locked until the connection 129 with the remote server 114 is established. This may provide a basis for enforcing, or pushing regular test information updates, testing device upgrades, test information exchange between the testing device 112 and the remote server 114, etc. For instance, upon establishing the connection between the testing device 112 and the remote server 114, the configuration update data may be automatically sent from the remote server 114 to the testing device 112, to ensure that configuration data is up to date. By way of a non-limiting example, the configuration update data may include at least a portion of a channel plan of the cable network 102. Also in one embodiment, upon establishing the connection 129 between the testing device 112 and the remote server 114, results of a previous test performed by the testing device 112 are automatically sent from the testing device 112 to the remote server 114, to ensure the test results are timely uploaded to the remote server 114 from each testing device 112 used to service the cable network 102.

Figure 3:
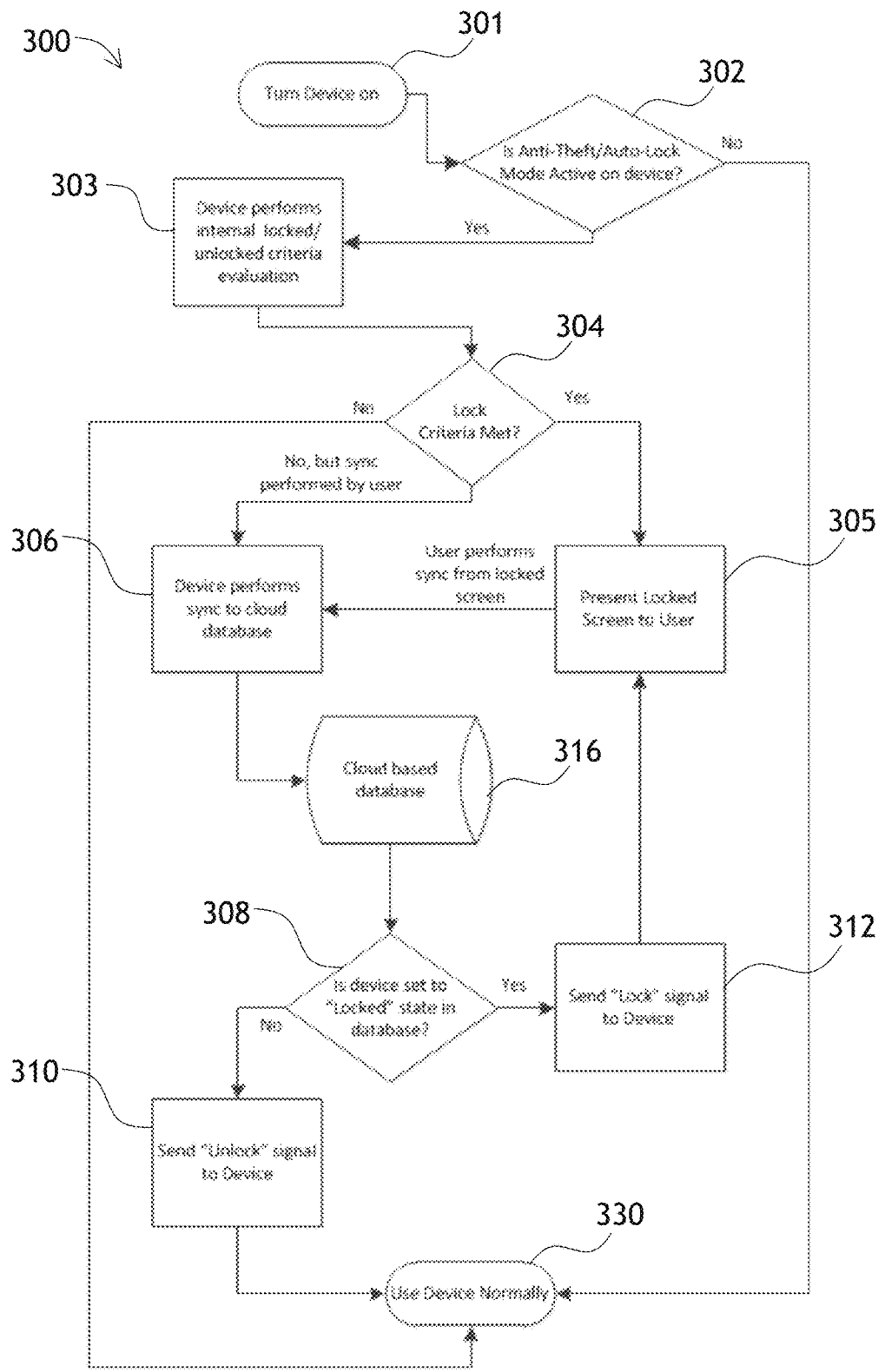
FIG. 3 illustrates one embodiment of the method of FIG. 2.
Figures 4A, 4B:
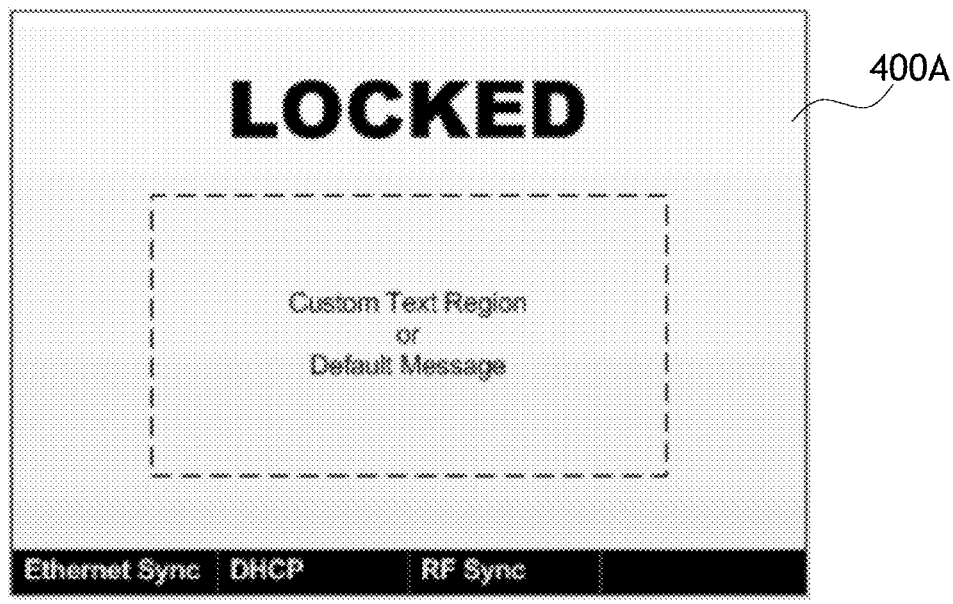
FIG. 4A illustrates an example view of a locked testing device's screen.
FIG. 4B illustrates an example configuration window for remotely configuring the number of days and/or power cycles before the testing device is automatically locked.

Referring now to FIGS. 3 and 4A with further reference to FIGS. 1A, 1B, and FIG. 2, a method 300 (FIG. 3) of operating the testing device 112 (FIG. 1B) and the server 114 (FIG. 1A) is an embodiment of the method 200 (FIG. 2). In a step 301 of the method 300 (FIG. 3), the testing device 112 is turned on. In a step 302 of the method 300, a check is performed if the Anti-Theft/Auto-Lock mode is active on the testing device 112. If the "Anti-Theft/Auto-Lock Mode" is not active, then the testing device 112 operates normally at step 330, without limitation of power up cycles, time of operation, etc., before re-connecting to the remote server 114. If the Anti-Theft/Auto-Lock mode is active, then the testing device 112 performs an initial locking criteria evaluation in evaluation 303 and decision 304 steps, which correspond to the threshold comparison step 204 of the method 200 of FIG. 2. If the locking criteria are not met, then the testing device 112 operates normally at step 330; if the sync is requested by the user, a synching step 306 is performed. If the lock criteria are met, then in a step 305 a "locked" screen, e.g. a screen 400A of FIG. 4A, is presented to the user. Once the "locked" screen 400A is presented, the user may elect to perform sync to a cloud-based database 316, which corresponds to the database 116 of FIG. 1A, or alternatively it may happen automatically in the synching step 306. The locking step 305 and the synching step 306 correspond to the locking step 206 of the method 200 of FIG. 2.

In a database querying step 308, a check is performed if the testing device 112, conveniently identified by a unique identification signal, a serial number or another ID number, etc., is set to "locked" state in the cloud-based database 316. The database querying step 308 corresponds to the checking step 208 of the method 200 of FIG. 2. If the testing device 112 is not set to the "locked" state in the cloud based database 316, then in a step 310 an "unlock" signal, corresponding to the unlock command 135 in FIG. 1B, is sent to the testing device 112. If the testing device 112 is set to the "locked" state in the cloud based database 316, then in a step 312 a "locked" signal, corresponding to the lock command 137 in FIG. 1B, is sent to the testing device 112.

Referring momentarily back to FIG. 1A, the authorized database administrator 142 may log in to the remote server 114 using an account number and a password to update the database 116 with Anti-Theft/Auto-Lock mode settings and threshold values for the testing devices 112, each testing device having a unique serial number. Referring now to FIG. 4B with further reference to FIG. 1B, a screen 400B (FIG. 4B) may be displayed for the authorized database administrator 142 to set up the Anti-Theft/Auto-Lock mode for each testing device 112. The Anti-Theft/Auto-Lock mode is turned on by checking the checkbox 401. When the checkbox 401 is checked as shown in FIG. 4B, the step 302 of the method 300 of FIG. 3 will result in the database checking/synching steps 303-308 being performed as described above. A "Days" textbox 402 denotes the number of days after which the database synching step 306 must be performed. Similarly, a "Power Cycles" textbox 403 denotes the number of power cycles, or startups, after which the database synching step 306 must be performed.

The cable network 102 is, of course, only an example of a network that may be serviced by the testing devices 112 (FIG. 1B), which are locked or unlocked using the method 200 (FIG. 2) or 300 (FIG. 3). The methods 200 and 300 may be used in networks of other types, e.g. hybrid fiber-coax (HFC) networks, passive optical networks (PON), etc. Furthermore, the hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure.

Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method for unlocking a testing device for testing a communication network, the method comprising:
   determining, by the testing device, a first value based on a number of previous power cycles of the testing device after a previous unlocking of the testing device, and a second value based on a time interval after the previous unlocking of the testing device;
   comparing, by the testing device, the first value to a first threshold comprising a maximum number of power cycles after the previous unlocking of the testing device, and comparing the second value to a second threshold comprising a maximum time interval after the previous unlocking of the testing device, and upon determining, by the testing device, that at least one of the first and second thresholds is exceeded, the testing device locking the testing device by disabling at least one operating function of the testing device;
   establishing, by the testing device, a connection between the testing device and a remote server in response to the locking of the testing device by the testing device;
   receiving, at the testing device via the connection, an unlock command from the remote server; and
   upon receiving the unlock command from the remote server, the testing device unlocking the testing device.

2. The method of claim 1, wherein the testing device is unlocked only by receiving the unlock command from a unique server address, and unlocking the testing device comprises enabling the at least one operating function of the testing device.

3. The method of claim 1, wherein the at least one operating function comprises a user interface function or a communication network test function.

4. The method of claim 1, further comprising:
   upon establishing the connection between the testing device and the remote server, the testing device performing at least one of:
      receiving configuration update data from the remote server along with the unlock command, to ensure that configuration data stored in the testing device is up to date; and
      sending results of a previous test performed by the testing device from the testing device to the remote server, to ensure the results are timely uploaded to the remote server.

5. The method of claim 1, wherein user input entered using a testing device keypad does not unlock the testing device.

6. The method of claim 1, wherein the connection is established by the testing device with the remote server in response to the testing device locking the testing device.

7. A method for remotely unlocking a testing device, the method comprising:
   coupling a server to a database comprising locking-related information for the testing device, wherein the locking-related information includes an indication of whether the testing device is in a locked state;
   establishing, in response to a request from the testing device, a connection between the server and the testing device, wherein the testing device is in a locked state that disables at least one operating function of the testing device, wherein the testing device is in the locked state after a determination by the testing device that at least one of a number of previous power cycles of the testing device after a previous unlocking of the testing device has exceeded a maximum number of previous power cycles, and a time interval after the previous unlocking of the testing device has exceeded a maximum time interval, and wherein the connection is established with the server by the testing device upon locking of the testing device by the testing device;
   determining, by the server, whether the testing device is to remain locked by referring to the testing device's locking-related information stored in the database; and
   upon determining that the testing device is not to remain locked, sending, by the server, an unlock command to the testing device for unlocking the testing device and enabling the at least one disabled operating function.

8. The method of claim 7, further comprising remotely updating the testing device's locking-related information by establishing a secure data communication link between an authorized database administrator and the server.

9. The method of claim 7, upon establishing the connection between the testing device and the server, the server sending configuration update data to the testing device.

10. The method of claim 9, wherein the configuration update data comprises at least a portion of a communication network channel plan.

11. The method of claim 7,
    wherein determining whether the testing device is to remain locked comprises determining, by the server, whether the testing device is in a locked state in the database, and
    upon determining that the testing device is to remain locked, sending, by the server, a lock command to the testing device to lock security configuration data of the testing device.

12. The method of claim 11, wherein determining that the testing device is to remain locked comprises determining an occurrence of a loss or a theft of the testing device.

13. The method of claim 7, further comprising:
    upon establishing the connection between the server and the testing device, the server receiving from the testing device results of a previous test performed by the testing device.

14. A system for remotely unlocking a testing device for testing a communication network, the system comprising:
    a database configured to store locking-related information for the testing device, wherein the locking-related information includes an indication of whether the testing device is in a locked state; and
    a server operably coupled to the database, the server comprising a hardware processor, wherein the server,
    in response to a locking of the testing device by the testing device placing the testing device in a locked state that disables at least one operating function, establish, upon initiation by the testing device, a connection between the server and the testing device, wherein the server is further to:
    determine whether the testing device is to remain in the locked state by referring to the testing device locking-related information in the database; and
    upon determining that the testing device is not to remain in the locked state, send an unlock command to the testing device to unlock the testing device and enable the at least one operating function of the testing device, wherein the locking of the testing device is based on at least one of a determination by the testing device that a number of previous power cycles of the testing device after a previous unlocking of the testing device has exceeded a maximum number of previous power cycles, and a determination by the testing device that a time interval after the previous unlocking of the testing device has exceeded a maximum time interval.

15. The system of claim 14, wherein the server is to update the testing device's locking-related information by establishing a secure data communication link between an authorized database administrator and the server.

16. The system of claim 15, wherein upon determining that the testing device is to remain in the locked state, the server is to send a lock command to the testing device to lock security configuration data of the testing device.

17. A testing device for testing a communication network, the testing device comprising:

access control logic including a hardware processor to:
determine a first value upon starting up the testing device based on a number of previous power cycles of the testing device after a previous unlocking of the testing device, and a second value based on a time interval after a previous unlocking of the testing device;

compare the first value to a first threshold comprising a maximum number of power cycles after the previous unlocking of the testing device, and compare the second value to a second threshold comprising a maximum time interval after the previous unlocking of the testing device; and upon a determination that at least one of the first value exceeds the first threshold and the second value exceeds the second threshold, lock the testing device by disabling at least one operating function of the testing device; and communication logic coupled to the access control logic, the communication logic to:
establish a connection with a remote server upon the locking of the testing device; and
receive, via the established connection, an unlock command from the remote server to unlock the testing device and enable the at least one operating function of the testing device.

18. The testing device of claim 17, wherein the remote server has a unique address, wherein the testing device is unlocked by sending the unlock command only from the unique address.

19. The testing device of claim 17, wherein the at least one operating function comprises a user interface function or a communication network test function.

20. The testing device of claim 17, wherein the testing device is to at least one of:
receive configuration update data from the remote server; and
send, upon establishing the connection with the remote server, results of a previous test performed by the testing device.

21. The testing device of claim 17, wherein the testing device further comprises a keypad, and wherein the access control logic prevents user input entered by way of the keypad from unlocking the testing device.

* * * * *